C. E. PECKHAM.
HAND CART SUPPORT.
APPLICATION FILED MAY 22, 1909.
947,454.
Patented Jan. 25, 1910.
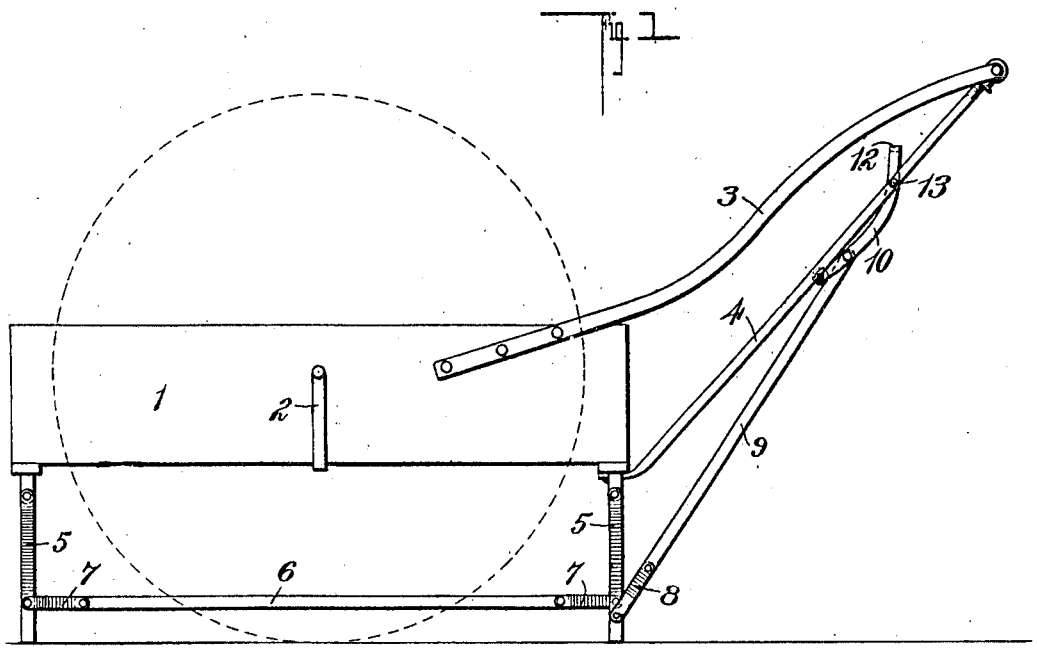
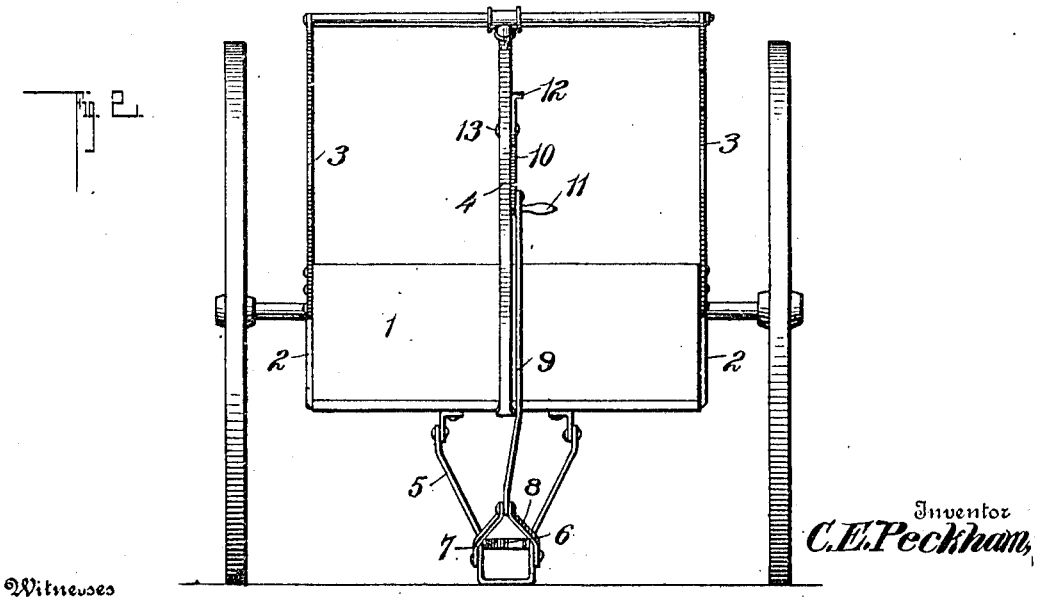

UNITED STATES PATENT OFFICE.

CLARENCE E. PECKHAM, OF COLUMBIA CROSS ROADS, PENNSYLVANIA.

HAND-CART SUPPORT.

947,454. Specification of Letters Patent. Patented Jan. 25, 1910.

Application filed May 22, 1909. Serial No. 497,686.

*To all whom it may concern:*

Be it known that I, CLARENCE E. PECKHAM, a citizen of the United States, residing at Columbia Cross Roads, in the county of Bradford and State of Pennsylvania, have invented a new and useful Improvement in Hand-Cart Supports, of which the following is a specification.

This invention relates to a support for two-wheel hand carts, and the object of the invention is to provide folding supporting legs at opposite ends of the cart which when thrown in downward position will support the cart at the ends while being loaded or unloaded, together with means for throwing said supporting legs into and out of position.

The invention consists in the novel features of construction hereinafter fully described, pointed out in the claims and shown in the accompanying drawings, in which:

Figure 1 is a side elevation, a wheel of the cart being shown in dotted lines, and the supporting legs being in position. Fig. 2 is an end view of the cart, the supporting legs being in operative position.

In constructing the invention, I employ a cart 1 mounted upon an angled axle 2, so that the cart rests within a short distance of the ground. The cart is provided with a rearwardly and upwardly extending handle 3, the handle bar being braced by a straight brace rod 4 connected at its upper end to the cross bar of the handle, and connected at its lower end to the under rear edge of the cart.

To support the cart at the ends while being loaded or unloaded, I pivot at the opposite ends of the cart two supporting legs 5 which I have shown formed of iron straps bent to the proper shape, thus forming a skeleton leg, but it will of course be understood that supporting legs of any desired shape or form may be employed, the essential point being the pivoting of the said legs below the cart so that they will fold. The front and rear supporting legs are connected by a rod 6, the ends of which are firmly connected to links 7 which links are in turn pivotally connected to the supporting legs. To the rear supporting leg 5 I also pivot a link 8 and to this link is riveted an operating rod 9, the upper end of which is pivotally connected to a curved lever 10, the pivotal point being adjacent one end of said lever, which end is provided with a laterally extending handle 11. The opposite end of the curved lever is angled as shown at 12 to form a stop, and the lever is pivoted to the brace 4 at the point 13, said pivotal point being substantially the same distance from the angled end 12 that the pivotal connection between the operating rod 9 and the lever 10 is from the handle 11. It will also be noted that when the supporting legs 5 are in use, the pivot point 13, and the pivot connections between the operating rod 9 and the lever 10, between said rod 9 and the link 8 and between said link 8 and the rear leg 5 are in a straight line. This serves to lock the supporting legs in their lowered position so that the cart will be firmly supported under the vibrations and jars incidental to the moving of the load, either in putting it into or taking it from the cart. It will also be noticed that when the parts are in this position the handle 11 bears against the rod 9. In order to throw the supporting legs upwardly it is only necessary to reach over the handle 3, grasp the handle 11 and draw it upward, until the angled end 12 strikes the operating rod 9. This will draw the rod 9 upwardly lifting the rear supporting leg 5 into a horizontal position, and by reason of the connecting rod 6 the supporting leg 5 will also be lifted and the cart will then be supported only by the cart wheels.

What I claim is:

1. The combination with a cart, supporting legs pivoted beneath the cart, means connecting said supporting legs, a handle for the cart, a brace rod extending from the handle to the cart, a curved lever pivoted to said brace rod, and an operating rod pivotally connected to said lever and to one of said supporting legs.

2. The combination with a cart having a handle, of a brace rod extending from the cart to the handle, pivoted supporting legs at the front and rear ends of the cart, links pivoted to said legs, a connecting bar firmly connected to said links, a lever pivoted to the brace, a second link pivotally connected to the rear supporting leg, and an operating rod firmly connected to the second mentioned link and to the lever.

3. The combination with a cart, of pivoted supporting legs, means connecting said legs, a cart handle, a brace rod extending from the handle to the cart, a curved lever angled at one end and provided with a handle at the other end, said lever being pivoted adjacent its angled end to the brace, and an operating rod pivotally connected to the lever adjacent the handle of the lever and loosely connected to the rear supporting leg, the lever handle bearing against the brace when the supporting legs are in use, and the angled end of the lever bearing against said brace when the said supporting legs are in elevated position.

CLARENCE E. PECKHAM.

Witnesses:
H. C. JONES,
W. J. VICKERY.